US006760665B1

(12) United States Patent
Francis

(10) Patent No.: US 6,760,665 B1
(45) Date of Patent: Jul. 6, 2004

(54) DATA CENTRAL FOR MANIPULATION AND ADJUSTMENT OF DOWN HOLE AND SURFACE WELL SITE RECORDINGS

(75) Inventor: Adrian Ronald Francis, Austin, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/442,391

(22) Filed: May 21, 2003

(51) Int. Cl.[7] .............................................. G01V 1/40
(52) U.S. Cl. ........................................... 702/6; 702/16
(58) Field of Search ........................... 702/16, 6, 9, 14; 367/69; 395/161; 707/1; 175/40, 45; 713/200; 703/2

(56) References Cited

U.S. PATENT DOCUMENTS

| | | | |
|---|---|---|---|
| 5,237,539 A | 8/1993 | Selman | 367/269 |
| 5,339,393 A | 8/1994 | Duffy et al. | 395/161 |
| 6,347,374 B1 * | 2/2002 | Drake et al. | 713/200 |
| 6,370,491 B1 * | 4/2002 | Malthe-Sorenssen et al. | 703/2 |
| 6,389,360 B1 * | 5/2002 | Alft | 702/9 |
| 6,612,382 B2 * | 9/2003 | King | 175/40 |

2002/0174092 A1  11/2002  Olson et al. ................... 707/1

FOREIGN PATENT DOCUMENTS

JP          07325736 A          12/1995

* cited by examiner

Primary Examiner—John Barlow
Assistant Examiner—Victor J. Taylor
(74) Attorney, Agent, or Firm—Brigitte L. Jeffery; John Ryberg

(57) ABSTRACT

A graphical user interface of a well logging display program for editing data records included in well logging data includes multiple windows and controls for user interaction. The well logging data includes measurements of logging variables collected at successive depths to define the data records. The multiple windows include a first window for displaying depth versus time measurements, a second window for defining a logging variable, a third window for selecting and displaying a first set of instances of the logging variable, and a fourth window for selecting and displaying a second set of instances of the logging variable. The multiple controls include a bar line for selecting a splice point, and an interface button for instructing the program to edit the data records. The edited data records include measurements corresponding to the first and second set of instances being spliced in accordance with a predefined function.

23 Claims, 11 Drawing Sheets

TIME-INDEXED DATA FILE 310

| TIME | DEPTH | CH 2 | CH 3 | CH 4 | CH 5 |
|------|-------|------|------|------|------|
| 131029 | 1450 | 2063.52 | 0.17 | 0.14 | 240.74 |
| 131130 | 1460 | 2065.08 | 0.19 | 0.14 | 217.48 |
| 131231 | 1470 | 2066.74 | 0.21 | 0.12 | 189.22 |
| 131330 | 1480 | 2068.48 | 0.23 | 0.15 | 194.63 |
| 131429 | 1490 | 2070.29 | 0.23 | 0.14 | 195.14 |
| 131530 | 1500 | 2072.16 | 0.24 | 0.13 | 182.12 |
| 131631 | 1510 | 2074.05 | 0.25 | 0.15 | 160.69 |
| 131730 | 1520 | 2076.01 | 0.27 | 0.14 | 142.08 |
| 131830 | 1530 | 2078.06 | 0.29 | 0.13 | 142.86 |
| 131929 | 1540 | 2080.19 | 0.30 | 0.13 | 131.60 |
| 132030 | 1550 | 2082.36 | 0.29 | 0.17 | 126.77 |

*FIG. 5A*

DEPTH-INDEXED DATA FILE 320

| DEPTH | TIME | CH 2 | CH 3 | CH 4 | CH 5 |
|-------|------|------|------|------|------|
| 1450 | 131029 | 2063.52 | 0.17 | 0.14 | 240.74 |
| 1460 | 131130 | 2065.08 | 0.19 | 0.14 | 217.48 |
| 1470 | 131231 | 2066.74 | 0.21 | 0.12 | 189.22 |
| 1480 | 131330 | 2068.48 | 0.23 | 0.15 | 194.63 |
| 1490 | 131429 | 2070.29 | 0.23 | 0.14 | 195.14 |
| 1500 | 131530 | 2072.16 | 0.24 | 0.13 | 182.12 |
| 1510 | 131631 | 2074.05 | 0.25 | 0.15 | 160.69 |
| 1520 | 131730 | 2076.01 | 0.27 | 0.14 | 142.08 |
| 1530 | 131830 | 2078.06 | 0.29 | 0.13 | 142.86 |
| 1540 | 131929 | 2080.19 | 0.30 | 0.13 | 131.60 |
| 1550 | 132030 | 2082.36 | 0.29 | 0.17 | 126.77 |

*FIG. 5B*

DATA CENTRAL FOR MANIPULATION AND ADJUSTMENT OF DOWN HOLE AND SURFACE WELL SITE RECORDINGS

BACKGROUND OF THE INVENTION

1. Field of the Invention

The present invention relates to data acquisition and logging systems for subsurface resource drilling, and more particularly relates to generating data for logging.

2. Related Art

The exploration for subsurface resources such as hydrocarbons including oil and gas, minerals and water, typically requires various techniques for determining the characteristics of geological formations. Many characteristics, such as the hydrocarbon volume, resistivity, porosity, lithology, and permeability of a formation, may be deduced from certain measurable quantities associated with the geological formations. It is a well-known technique to measure these characteristics, i.e., measured variables, by drilling a well in conjunction with a data acquisition and logging system.

Much of the information acquired by such a system is acquired by a sensor-equipped drilling tool and is categorized as either "real-time or recorded" "mode data." The term "real-time" data, as used herein, includes data acquired while the logging tool is in the well and transmitted to the surface and recorded shortly after being acquired. That is, transmitting and recording is typically substantially completed while the logging tool is in the well, which requires transmitting by a method with limited bandwidth, such as mud-pulse telemetry. The limited data transfer rates of down-hole telemetry systems reduces the number of transmission and recording channels, the sample interval, or both. Consequently only a subset of the recorded data can typically be transmitted as real-time data.

In the "recorded mode," data is acquired and stored in a memory device of the logging tool. The recorded data may be subsequently retrieved from the memory when the logging tool is brought to the surface. The term "recorded data," as used herein, includes data stored in the memory of the logging tool while the logging tool is in the well. Thus, recorded data are distinct from real-time data.

Another category of information acquired by a data acquisition and logging system is data acquired by surface measurement devices, which are typically located above ground. Surface measurements generally include depth and other measurements, such as hookload and surface torque. Depth measurement is computed by measuring the length of a drill string.

Aside from the above, information acquired by a data acquisition and logging system may also be categorized according to states, i.e., "modes," of the drilling rig while the data is acquired. It is well known that the drilling rig can be operated in several modes such as drilling, reaming, and tripping to penetrate the geological formations. For example, during the drilling operation the drilling bit is described as being "on-bottom". (It should be understood that the term "drilling" has a rather specific meaning when used in the context of operating in a "drilling mode," as just described. The term "drilling" may also be used in a more general sense, such as in the context of "drilling the well" or "measurement while drilling" ("MWD"), which are mentioned herein below.) In the reaming operation, the logging tool is rotating or not rotating and the bit is "off-bottom" (i.e. not drilling), regardless of whether the drilling tool is moving up or down. In the tripping mode the drilling tool is being lowered into or pulled out of the oil well, but generally is not rotating. For the purposes of this invention, "reaming" covers both tripping and reaming.

A drilling rig is typically capable of operating only in one mode at a given instant. For example, the rig cannot be reaming and drilling at the same time. Consequently, when the rig is reaming toward bottom, the rig mode automatically changes to the drilling mode as soon as the bit touches the bottom of the hole. Therefore, in data acquisition terms, data acquired in a reaming operation is not "on-bottom".

In addition to acquiring measured variables in numerous categories, the above described measurements are, of course, made at a multitude of successive depths. Moreover, numerous instances of the respective measurements are often made at a single depth. For example, a first instance of each measurement is made while a drill bit, drilling the well, is on-bottom and additional instances of the measurement are made as the drill bit is raised up ("reaming up") or lowered back down ("reaming down"). That is, depth intervals are re-traversed selectively while measuring continues. Once the drill bit gets back to the bottom of the well, i.e., back "on-bottom," new instances of the measurements are made at successive new depths.

From the above it should be appreciated that information acquired by a data acquisition and logging system is typically voluminous. In addition, the data acquired in well logging may be acquired over a period of days, weeks or even months. Consequently, the system automatically processes data as it is acquired to make the data more manageable and accessible. For example, a set of data of particular interest is typically identified by the well logging system by automatically generating a data file for it. One such automatically generated file is a depth-versus-time data file, which has records for data that is acquired on-bottom.

It is often necessary to manually edit these well logging data files, particularly those that are generated automatically. For example, on-bottom data collected by a failed sensor may require a substitution for the 'bad' on-bottom data of off-bottom data that has been collected by an alternate sensor. This manual editing is, of course, made more complex by the volume and variety of data, as described above.

As another example, length of a drill string is typically used to measure depth of the well. The length of the drill string may vary depending on various factors such as tension and temperature. Thus, raw depth measurement data for depth measurement is calibrated manually at a predefined periodic depth interval. The raw depth measurement data is combined with the manually entered depth measurement data to generate corrected depth measurement data.

Despite the complexity of the editing process for well logging data, conventional systems generally have only limited tools for manipulating data records. Therefore a need exists for improvements in such tools.

SUMMARY

The foregoing need is addressed by the present invention, according to which a graphical user interface ("GUI") of a well logging display program includes multiple windows and controls for user interaction and editing of data records included in well logging data. The well logging data includes records of logging variables measured at successive depths. The windows include a first window for displaying depth versus time measurements, a second window for selecting one of the logging variables, a third window for selecting and displaying a first set of instances of the logging variable, and a fourth window for selecting and displaying a second set of instances of the logging variable. The controls include a bar line for selecting a splice point, and an interface button for instructing the program to edit the data records. The data records resulting from the editing include measurements corresponding to the first and second set of instances spliced in accordance with a predefined function.

Other forms, as well as additional aspects, objects and advantages of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A and 5B illustrate further detail of a time-indexed and a depth-indexed data file, according to an embodiment.

DETAILED DESCRIPTION OF THE PREFERRED EMBODIMENT

Figure 1:
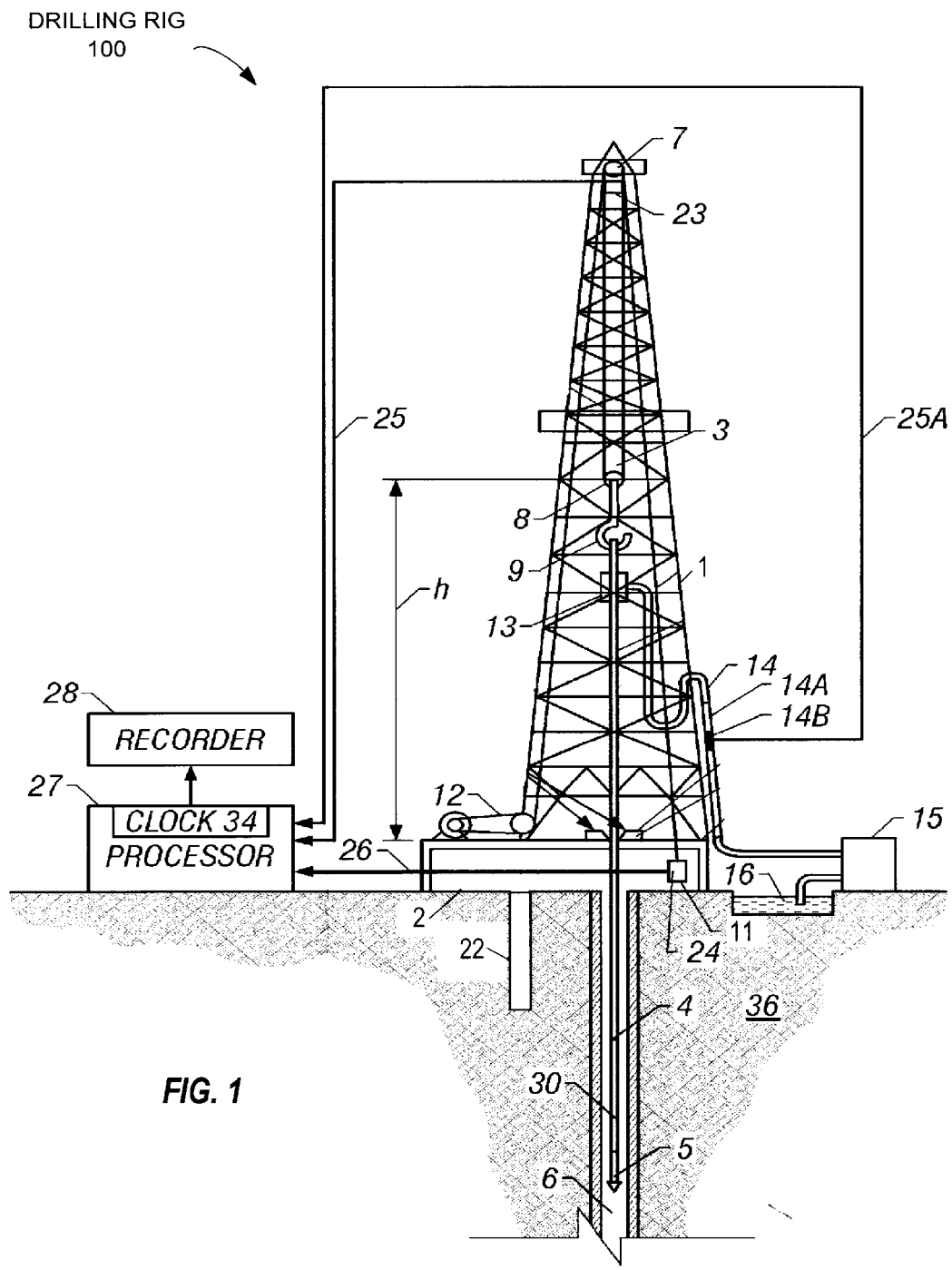
FIG. 1 illustrates a drilling rig and drill string in accordance with an embodiment of the present invention.

In the following detailed description of the preferred embodiments, reference is made to the accompanying drawings illustrating embodiments in which the invention may be practiced. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

The following terminology may be useful in understanding the present invention. It is to be understood that the terminology described herein is for the purpose of description and should not be regarded as limiting.

Bottom Hole Assembly ("BHA")—This is the tubular equipment used for the drilling process. It contains all tools used to attain formation evaluation, drilling mechanics and directional measurements.

Ream Pass—This is an area of open or cased hole where the measurement tools are passed along the well bore at a controlled speed to gather formation evaluation measurements in real-time and/or recorded mode. No drilling is performed during a reaming pass.

Bit Run Pass—This is all the data recorded during drilling between the times the bottom hole assembly passes below the rotary table to the time when it is brought back to the surface.

Real-Time ("RT") Mode—Data sent to the surface from the MWD and LWD tools during the drilling and off bottom process and stored using surface acquisition computers. It also includes measurements gathered from surface measurement sensors positioned around the well site.

Recorded Mode ("RM")—Data stored in the tools memory and not retrieved until the tool is brought back to the surface. Its values are stored at a more frequent time interval and subsequent depth than that sent by the tool to surface acquisition equipment. Recorded mode data typically produces increased log resolution compared to real-time mode data.

True Vertical Depth ("TVD")—The depth measurement taken from the well floor or other permanent datum to which depth data is referred. It does not follow the path of the well bore but is measured to a reference directly below the permanent datum.

Default On Bottom Composite Over Whole Well ("DOBCOWW")—This is a set of data records that are stored and used to create hard and soft copies of logs for client delivery. By default it consists of the 'on bottom' drilling data that is acquired to the deepest depth at the earliest point in time.

Off-Bottom—This is the name given to the times and subsequent data when the drill string is not in drilling mode or in a state of up or down reaming.

Dependencies—Refer to channels or logging variables that are stored and used in the creation of other subsequent channels or logging variables. These channels can be a direct derivative of a recorded channel or made up from inputs from one or more channels.

Versioned Acquisition Pass ("VAP")—The data acquired between starting and stopping acquisition once for a given index (time or depth).

Composite Well Log Data Set ("CWLDS")—Made up of VAPS using the standard procedure of the deepest data that was attained earliest in time.

FIG. 1 illustrates a drilling rig 100 and drill string with a down-hole data acquisition and logging system for exploring drill hole environment 36. Drill string 4 is suspended from hook 9 by means of swivel 13 linked by hose 14 to mud pump 15, which permits the injection of drilling mud into well 6, via the hollow pipes of drill string 4. Hose 14 is attached to standpipe 14A. Attached to standpipe 14A, one or more sensors 14B receive signals from within the well 6 via mud pulse telemetry. Mud pulse telemetry sensors 14B are coupled via signal line 25A to processor 27. Processor 27 incorporates a clock 34. Accordingly, sensors 14B function as measurement tools for delivering measurements to processor 27 and recorder 28. Processor 27 includes a clock 34 for providing a time measurement, as described in greater detail below. The drilling mud may be drawn from mud pit 16, which may be fed with surplus mud from well 6. The drill string may be elevated by turning lifting gear 3 with winch 12 and the drill pipes may be successively removed from (or added to) well 6 and unscrewed in order to remove bit 5.

The lowermost portion of the drill string 4 may contain one or more tools, as shown as tool 30 for investigating down-hole drilling conditions or for investigating the properties of the geological formations penetrated by the bit 5 and borehole 6. The tool 30 is a logging tool capable of logging one or more different types of measurements and includes at least one measurement sensor. The tool 30 may be equipped for logging measurements of resistivity, gamma ray, density, neutron porosities, calipers and photoelectric effect as may be desired. Further, the tool 30 may be equipped to include sensors for drilling-related measurements such as direction, depth, and inclination and include equipment for data recording and telemetry.

Variations in height h of traveling block 8 during drill string raising operations are measured by means of sensor 23, which may be an angle of rotation sensor coupled to the faster pulley of crown block 7. Sensor 23 and strain gauge 24 are connected by signal lines 25 and 26 to a processor 27 which processes the measurement signals.

Figure 2:
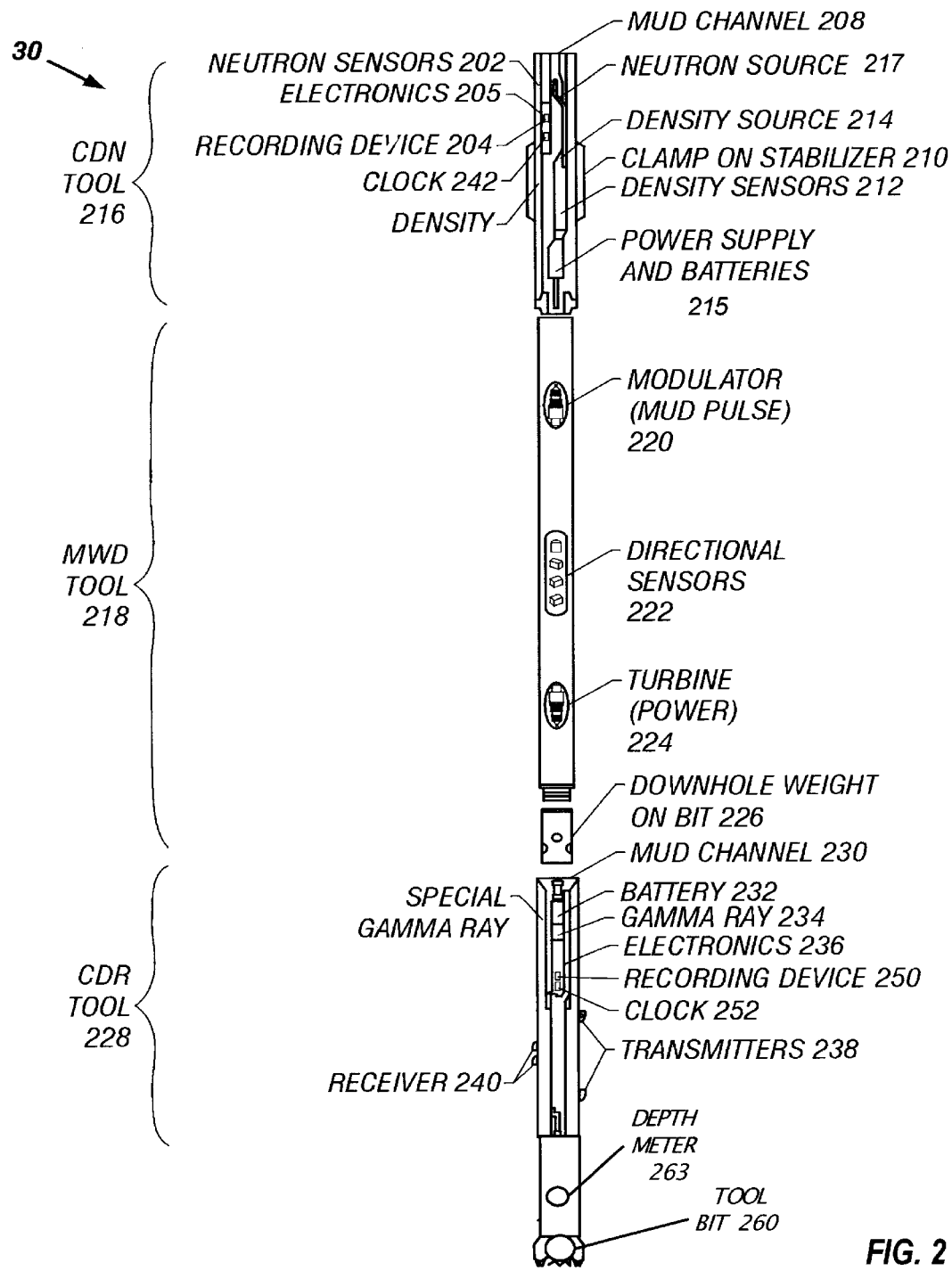
FIG. 2 illustrates a drilling bottom hole assembly (BHA) with several tools appropriate for embodiments of the present invention.

Referring to FIG. 2, a more specific view of the tool 30 is shown. The tool 30 includes equipment according to an embodiment of the present invention appropriate for logging while drilling (LWD) and measurement while drilling (MWD), as design requirements may dictate. MWD data may include data acquired during both drilling and reaming, is typically indexed in time, and may or may not include recorded data. For certain applications, time-indexed data is of primary interest, but some data is of interest indexed in depth, e.g., the distance along the borehole. Typically, a main log includes "on-bottom" data acquired when a sensor associated with the drilling tool passes in front of a zone of interest for the first time. The sensor is likely to pass that zone of interest several more times during the course of drilling the well. Data for these subsequent passes, generally referred to as "reaming passes" may be of interest to be viewed as depth-indexed data.

As shown, the tool 30 includes three portions, each of which may be included or excluded from the tool 30, as measurement system requirements require. The tool 30 may include a compensated dual resistivity tool (CDR) or other type of resistivity tool 228, a measurement-while-drilling (MWD) tool 218, a compensated density neutron (CDN) tool 216, as well as other known specific measurement type tools. Each of the CDR, MWD and CDN type tools, as chosen are coupled together to form the tool 30. Specifically, a CDN tool 216 includes neutron sensors 202, a neutron source 217, a density source 214, clamp on stabilizers 210, density sensors 212 and power supply and batteries 215. The CDN tool 216 further provides a mud channel 208 that allows mud to flow through the tool 216. CDN tool 216 further includes electronics 205, which may include a recording device and a clock.

The CDN tool 216 can be coupled above an MWD tool 218. The MWD tool 218 includes a modulator 220 for transmitting via the mud channel 208, directional sensors 222 configured to triangulate the location of tool 30 and a turbine 224 configured to provide power to the tool 30. The MWD tool 218 further includes a down-hole weight for a bit 226, which includes torque sensors. The MWD tool 218 may be coupled to a CDR tool 228. The CDR tool 228 is shown including a mud channel 230 that flows through the tool 30, battery 232, gamma ray equipment 234, electronics 236, transmitters 238 and receivers 240. As one of skill in the art appreciates, the number of transmitters and receivers is according to design requirements. Electronics 236 includes a recording device 250 coupled to a clock 252. The CDR tool 228 or the MWD tool 218, determined according to the configuration chosen for the tool 30, are coupled to a motor and a drill bit 260 configured to drill in the drill hole environment 36.

LWD tools, which include the CDN tool 216, the CDR tool 228 and the MWD tool 218, provide measurements that indicate a hole trajectory and provide drilling mechanics measurements in real time. LWD measurements provide resistivity, neutron, density and gamma ray measurements, among other measurements in real time. Generating off-bottom data, after the drilling is complete, is desirable, as it might not be recognized during the drilling process that this data will be of interest. A further benefit of LWD and MWD is that the measurements stored in recording devices 204 and 250, may be combined with wireline logs for a complete evaluation of the formation 36.

Wireline logs are typically taken down hole, transmitted through the wireline to the surface based computer systems and recorded at the surface. MWD and LWD logs are also typically taken down-hole. They are either transmitted to the surface based computer systems by mud pulses, or else recorded down-hole by the recorder 28 and retrieved later when the tool 30 is brought to surface (or both, typically). Mud logs that describe samples of drilled cuttings are taken and recorded on surface.

The data acquisition and logging system that includes the tool 30, according to an embodiment of the present invention, is equipped for generating ream section data, preferably after completing the data acquisition. LWD and MWD tools include sensors, such as transmitter 238 and receiver 240 that measure different characteristics of the formation. In practice, the drilling of a well, e.g., an oil or gas well, requires repeated movement of the sensors of the tool 30 over a same area. For example, when the tool bit 260 requires replacement, the tool 30 is removed from the well and replaced. Further, during the course of drilling a well, the drill bit and drill string will be "reciprocated" or "reamed" within the borehole (moving it up and down) to assist in cleaning the hole (ensuring the cuttings are circulated to surface) and general hole conditioning. Thus, during the drilling of a well, the tool 30 retracts repeatedly during the course of drilling and measuring the geological formation.

In an embodiment, the tool 30 is configured to take advantage of the repeated retracting and insertion of the tool 30. More particularly, in the embodiment, a clock, such as clock 252 within the tool 30, or clock 34 outside the tool 30, is synchronized with a depth measurement of the tool 30 to operate measurement tools within the tool 30 that log measurements of resistivity, gamma ray, density, neutron porosities, calipers and photoelectric effect. According to the embodiment, the tool 30 repeatedly correlates one or more predetermined depths or zones of interest, or the entire depth zone in some cases, with a time parameter and associates the correlated time/depth measurement with the qualitative log measurements.

Figure 3:
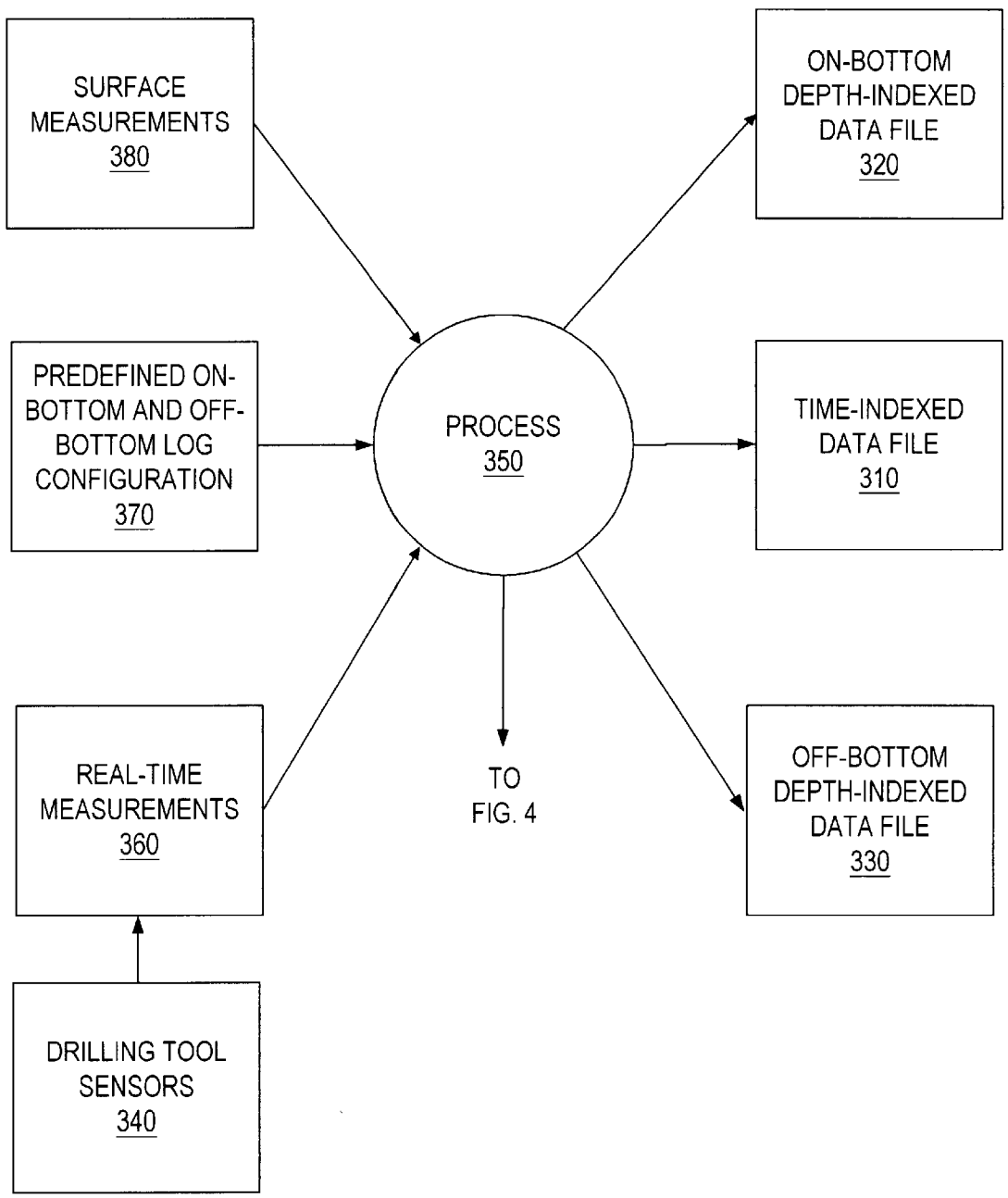
FIG. 3 illustrates a block diagram for generating data records from real-time data, according to an embodiment.

Referring to FIG. 3 in conjunction with FIG. 1, a block diagram is illustrated for generating ream section data from real-time data, according to one embodiment. A variety of measurements such as those described above in connection with FIGS. 1 and 2 are acquired at time intervals and marked with corresponding time indices, i.e., the measurements are acquired as time-indexed data. Separate measurements of depth are made. The depth measurements are combined or 'gated', for example by considering on-bottom data, to give a profile of various measurements versus depth, which is often the desired product.

More specifically, the drilling tool 30 typically acquires real-time measurements 360 from sensors 14B. Surface measurements 380, which are typically acquired above the drill hole 6, generally include depth measurement and other measurements, such as hookload and surface torque, that allow the creation of a time/depth profile. The depth measurement is computed by measuring the length of the drill string 4.

A process 350, which is typically a software program, generates a time-indexed data file 310 that includes recorded real-time measurements 360 and surface measurements 380. That is, file 310 is generated by process 350 as an output in response to receiving the real-time measurements 360 and surface measurements 380 as inputs.

The time-indexed data file 310 includes values for each of the logging variables (also referred to as measured variables) arranged in a particular format, e.g., tabular. Each row of the time-indexed data file 310 corresponds to and is identified by a unique time index, and each column includes values for the column's respective logging variable. That is, the values in a column are for a particular logging variable, and the value in a particular row of the column is for that particular logging variable measured at the time indicated by the unique time index for that row. Additional detail of an embodiment of the time-indexed data file 310 is illustrated in FIG. 5A.

Certain issues complicate the simplicity of the above described data structures. For example, the data channels may be irregularly sampled, and the time indices used for one channel may be different than those used for a different channel. To address these issues, the data channels may be placed on a "grid". A grid is a term that is used to describe when all the data is placed in a table with the same index. For example, if data for channel 1 was sampled at 5, 15, 30, 45 seconds and data for channel 2 was sampled at 10, 25, 45 seconds, then a grid may be prepared by combining values for channel 1 and channel 2 in the same table which has an index of 5, 10, 15, 25, 30, 45—and a column for each channel. The channel columns would have gaps or null values where there was no data. The process of preparing a grid may be described as "gridding." "Gaps" if present may be filled by the gating process described earlier.

To assist in mapping between time and depth domains, it is common to dedicate one channel of the time-indexed data file 310 for depth measurement. The depth data is as a surface measurement 380 rather than a measurement recorded downhole or transmitted from downhole. Depth is generally sampled at a much higher rate than much of the other well log data, but it can be placed on the same grid—as described above.

Once acquired, the contents of the time-indexed data file 310 are static, i.e., the contents of the data file typically do not change. In some cases, if a parameter used to calculate the file is incorrect, the data is re-processed or re-computed using a new value of that parameter. However, this generally creates a new time-indexed data file (not shown in FIG. 3).

In addition, the process 350 includes functionality to map time-domain data to the depth-domain. An example of an output of the process 350 is the depth domain data stored in file 320. This is a lossy mapping, since the depth domain output of process 350 into file 320 only includes on-bottom data. Thus, by considering on-bottom data, which includes first instances in time of measurements at each recorded depth, process 350 generates the depth-indexed data file 320 as an output. The depth-indexed data file 320 includes values for each of the logging variables. Each row of the depth-indexed data file 320 is identified by a unique depth index, and each column (also referred to as a "channel" or "field") includes default, on-bottom values for the column's respective logging variable at each of the successive depths. Further details of the depth-indexed data file 320 are illustrated in FIG. 5B, according to an embodiment. It is common to dedicate one channel of the depth-indexed data file 320 for time measurement to assist with traceability. Once acquired, the contents of the depth-indexed data file 320 are static, according to the alternative of FIG. 3. In some cases, if a parameter used to calculate the file is incorrect, the data is re-processed or re-computed using a new value of that parameter. This creates a new depth-indexed data file (not shown in FIG. 3).

The process 350 also generates a depth-indexed, real-time, off-bottom data file 330 (also referred to as "ream section data" or "data from a ream pass" or simply "a ream pass") in response to receiving a predefined, off-bottom data configuration 370 as input. User interaction is required to change the rig mode to 'ream up' or 'ream down'. A ream section is created by notifying the surface system that the rig mode has changed. The configuration 370 typically includes a user definition of off-bottom log characteristics such as an up-ream or down-ream log. For example, the configuration 370 for a ream log pre-defines the generation of separate files for each ream section data having a user defined starting and ending depth. This off-bottom data is collected while the bit is off-bottom and until the process 350 is stopped or the drill bit reaches the bottom, i.e., starts drilling. Data collected for the additional depth-based data set is output as the depth-indexed, ream section data file 330. However, in the embodiment of FIG. 3 the process 350 does not permit creating new, i.e., not predefined, off-bottom logs on the real-time data after the data has been acquired.

Figure 4:
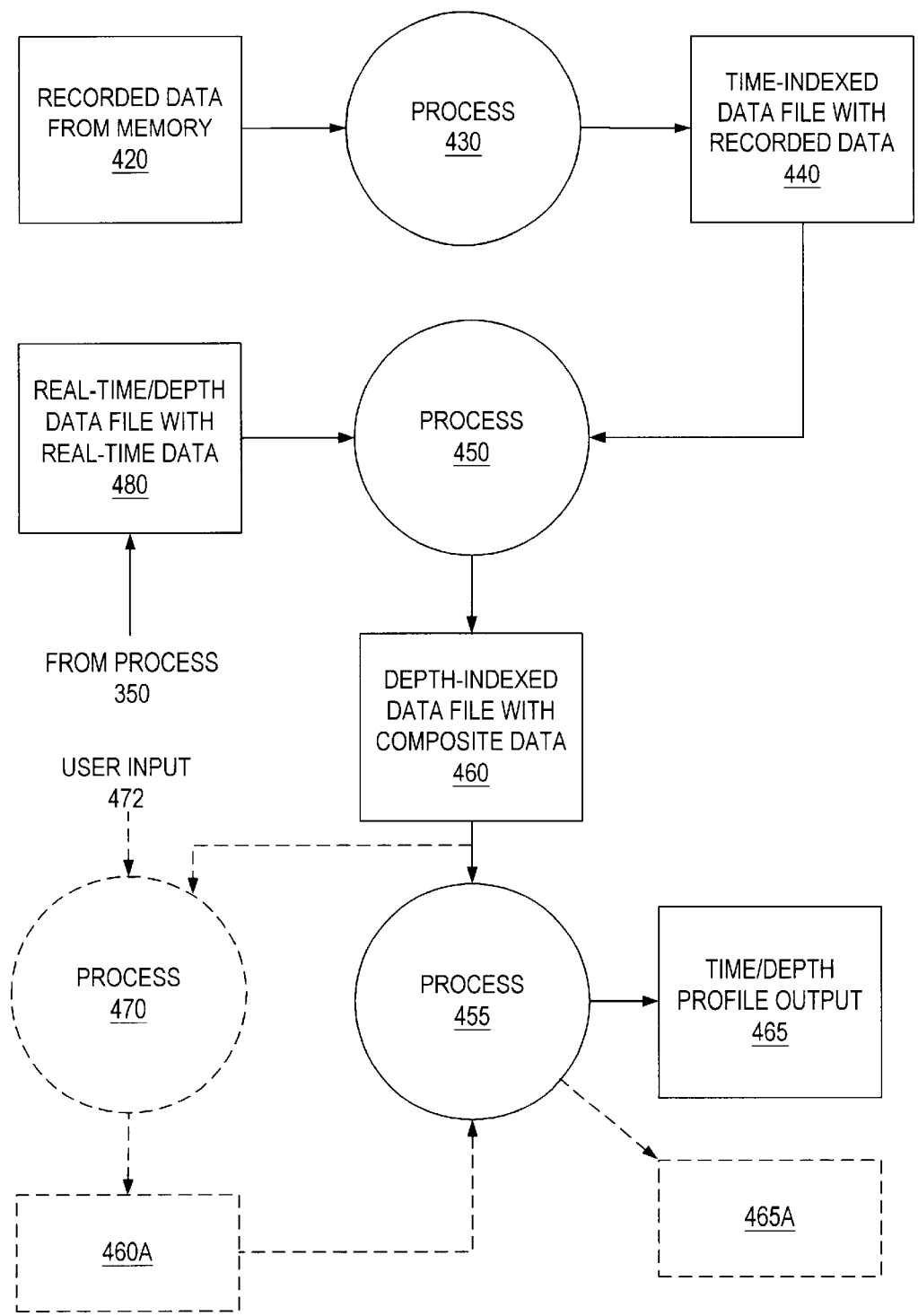
FIG. 4 illustrates a block diagram for generating composite data records from recorded and real-time data, according to an embodiment.

Referring to FIG. 4, a block diagram is illustrated for generating time-depth profile data from real-time and recorded data, according to an embodiment. As previously stated, a large amount of duplicate data is typically recorded over the same depth range. Some of the data recorded is on-bottom and some of it is off-bottom, depending on the drilling status.

As described earlier, the drilling tool 30 acquires and stores in memory well data obtained while the drilling tool 30 is in the drill hole. When the drilling tool 30 and its memory device is retrieved from the well, the contents of the memory are transferred to a recording of the data 420. A process 430, e.g., a software program, generates a time-indexed data file 440 for recorded data as an output in response to receiving the recorded data 420 from memory as an input. The time-indexed data file 440 is typically correlated with the time-indexed data file 310 (FIG. 3) for synchronization. Further details applicable to the time-indexed data files 310 and 440 are illustrated herein below in FIG. 5B, according to an embodiment.

A process 450, e.g., a software program, reads inputs from i) time-indexed data file 440, which includes recorded data, and ii) a real-time/depth data file 480, which includes real-time data, typically stored as an ASCII file. The real-time/depth data file 480 is generated by the process 350 of FIG. 3, and may include data records from files 310, 320 and 330. The real-time/depth data file 480 is used to produce a profile 601 (FIG. 6), which graphically depicts whether data associated with the profile is on-bottom or off-bottom. The time/depth profile 601 may be produced for any type of data such as recorded data, real-time data or combined data.

Referring to FIG. 3, data file 480 may include time-indexed data (file 310), on bottom depth indexed data (file 320) and reaming data (file 330). Data file 480 contains only real-time data and not a combination of real-time and recorded data. Depending on file 310 or 320 or 330, File 480 may include on bottom only (file 320), off bottom only (file 330) or combination (file 310).

From these inputs 440 and 480, the process 450 generates composite time-depth profile data records that include on-bottom and off-bottom depth measurements versus time. The composite time-depth profile data records, which include real-time and recorded data records, are stored in a depth-indexed data file 460.

A subset of the data records included in the file 460 is used as an input by a process 455, e.g., a software program, to generate a time-depth profile output 465 that includes data acquired both on-bottom and off-bottom. The user defines or selects a certain depth range to define the subset of the data records. The data of the time-depth profile output 465 is for displaying in a graphical form as profile 601 (FIG. 6), for example, on a display screen or for printing in such a graphical form on a printer of the logging system. Further detail of the time/depth profile information is described in FIG. 6, according to an embodiment.

On reviewing the time-depth profile output 465, the user may determine that there is a need to edit the set of on-bottom data records that are used to generate the output 465. This may be necessary because, for example, a sensor acquiring on-bottom data has failed during operation at a certain depth range. A process 470 provides tools to enable the user to selectively replace the bad on-bottom data with off-bottom data acquired by another sensor at the same depth range. The process 470, responsive to user inputs 472, generates a new depth-indexed data file 460A from the original depth-indexed data file 460. Specifically, in the new file 460A the bad on-bottom data records of file 460 are omitted and off-bottom data is identified and copied into file 460A in place of the data records that are omitted. The process 455 is then re-executed using the new file 460A, and the process generates a new time-depth profile output 465A.

Referring to FIGS. 5A and 5B, additional detail is illustrated for embodiments of depth-indexed data file 310 and time-indexed data file 320, which were referred to in FIGS. 3 and 4. The time-indexed data file 310 includes measured variables values 520, also referred to variously herein as "data," "measured variables," or "logging variables," arranged in a tabular format of rows 515 and columns 517, as illustrated in FIG. 5A. (The format illustrated for file 310 may also apply to time indexed file 440 (FIG. 4).) Each the value 520 of a measured variable in a row 515 of the file 310, also referred to as a "record" or "data record," corresponds to and is identified by a unique time index 560. Each column 517, also referred to herein as a "field" or a "channel," includes values 520 for a respective one of the measured variables, such as one of those lithography measurements described above in connection with FIGS. 1 and 2. That is, the values 520 in a column 517 are for a particular logging variable, and the value 520 in a particular row 515 of the column is for that particular logging variable measured at the time indicated by the unique time index 560 for that row 515. (A column 517 may also be referred to as a "channel" because each measured variable value 520 in the column 517 is measured by its own "channel" of the data acquisition system.) Measured variable identities 510 are set out in a header above the first row 515 of each respective column 517 of measured variable values 520. According to the embodiment shown, the first one of the columns 517 is used as an index 560 to the file 310. In the case of the time-indexed data file 310, the index 560 column 517 contains rows 515 of time measurements, and the "DEPTH" channel 517 contains rows 515 of depth measurements for each corresponding time. In other words, the rows 515 of the time-indexed file 310 are sorted by time. Similarly, the depth-indexed data file 320 includes data arranged in a tabular format, as illustrated in FIG. 5B. Like data file 310, the data file 320 has measured variable values 520 in rows 515 and columns 517 with their identities 510 shown in a header. The depth-indexed data file 320, however, has a depth index 550, typically in the first column, used an as index to the file 320 rather than a time index. In this case, the first column is, by definition, the index. The "TIME" channel 517 for the depth-indexed file 320 contains rows 515 of time values for each corresponding depth. In other words, the rows 515 of the depth-indexed file 320 are sorted by depth.

The structure of files 310 and 320 shown in FIGS. 5A and 5B is similar, in many respects, for other files referred to herein, according to an embodiment of the invention. Accordingly, reference made herein to these FIGS. or to elements of these FIGS., such as measured variable values 520, measured variable identities 510, index 560, row 515, column 517, etc., are not necessarily meant to imply a reference to files 310 or 320. In creating a file, the index 560 is chosen when the file is created. In each succeeding row 515, the index 560 increases in value 520. In some operations such as reaming up the index 560 may appear to decrease in value as the tool 30 approaches the surface. However, in such processes such as reaming up, the process, e.g., process 350, takes care takes care of the inversion and all data is recorded with an increasing index.

In an embodiment, data for file 320 is oversampled in time—meaning that measurements at several depths are averaged to generate a nominal measurement for a single depth. Averaging is one choice for dealing with oversampling, as determined by the gating function. Other choices such as geometric mean, harmonic mean, linear interpolation and logarithmic interpolation may also be possible. It should be understood that for such oversampled data the data files 310 and 320 may have different or additional features such as data files with several tens of rows 515 and columns 517. However, the data files 310 and 320 of the embodiments of FIGS. 5A and 5B are suitable for understanding important features of the present invention.

Figure 6:
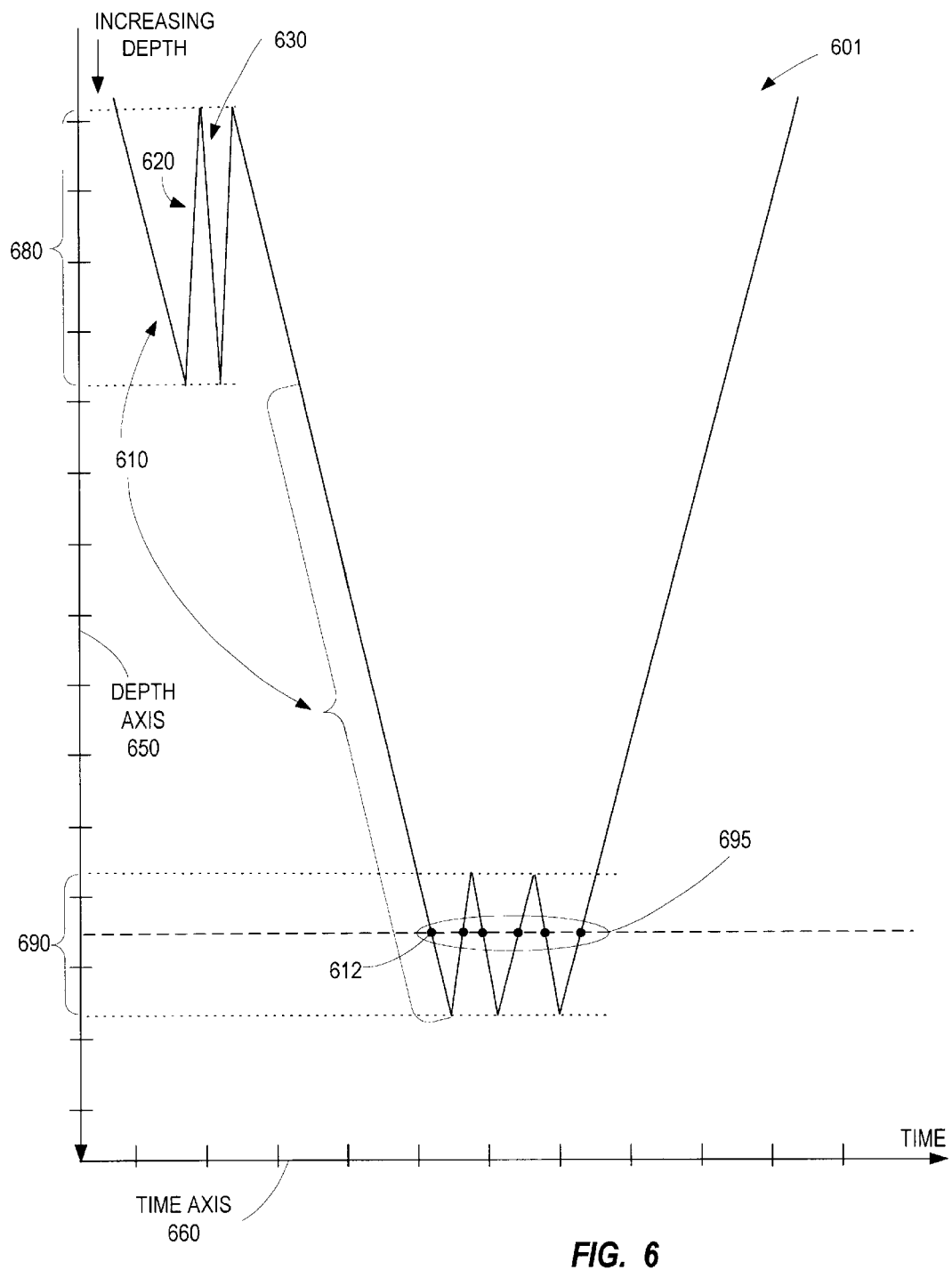
FIG. 6 illustrates a time/depth profile of well logging data, according to an embodiment.

Referring to FIG. 6, a time/depth profile 601 is illustrated, as it relates to information in various ones of the files depicted in FIGS. 3, 4, 5A and 5B. The time/depth profile 601 has depth values 520 (FIGS. 5A and 5B), plotted on a vertical, depth axis 650 versus corresponding time values 520 plotted on a horizontal, time axis 660. As to the range of the values 520, the depth values 520 may vary from a few hundred feet to several thousand feet, while the time values 520 may vary from minutes to several days. The values 520 are plotted with increasing magnitude from the top to the bottom of the depth axis 650, and from left to right on the time axis 660.

Measurements for channels 517 (FIG. 5) are, of course, made at discrete intervals, which may be regular or irregular. Generally, the measurement time intervals will vary episodically over the course of drilling. For example, measurements will be more frequent, i.e., with shorter time intervals between measurements, when drilling at depths of greater geological interest. Similarly, intervals between depth measurements will also vary. In the time-depth profile 601 of FIG. 6, measured time and depth values 520 are processed, such as by averaging, and are selected for plotting at substantially regular intervals, as may be seen from the regular spacing between tics on the time axis 660 and depth axis 650.

The values 520 graphically set out in the time/depth profile 601 correspond to values set out in a tabular format in various ones of the previously described data files, such as the real-time/depth data file 480 (FIG. 4), depth-indexed data file with composite data 460 (FIG. 4), time-indexed data file with recorded data 440 (FIG. 4), time-indexed data file 310 (FIG. 3), on-bottom depth-indexed data file 320 (FIG. 3) or the off-bottom depth-indexed data file 330 (FIG. 3), composite time/depth profile depth-indexed data file 460. The data for any particular section of the profile 601 depends, at least in part, on the indicated context. That is, the measurements which provide the data for profile 601 are made in connection with operation of the drilling rig in its various modes, such as drilling 610, reaming up 620 and reaming down 630, as previously described. Consequently, the portions of the profile 601 which graphically set out values 520 for measurements made while drilling 610, for example, may be from a combination of the data for files 310 and 320, such as on-bottom depth-indexed data (file 320) and time-indexed data (file 310). (As previously stated, drilling 610 may be referred to also as an "on bottom" condition.) Likewise, the portions of the profile 601 which graphically set out values 520 for measurements made while reaming up 620 or reaming down 630 may be from a combination of the data for files 310 and 330, such as the off-bottom depth-indexed data (file 330).

In sections 680 and 690 the profile 601 shows several reaming passes. In FIG. 6, reaming up portion of the profile 601 labeled as "620" is the first instance of reaming up that is shown, i.e., the first "pass" of reaming up. Likewise, the reaming down portion labeled as "630" is the first instance of reaming down that is shown. Measured variable values 520 for selected ones of the reaming passes in these sections 680 and 690 are saved in respective files, according to an embodiment of the invention. Having selected to generate ream data over a section such as section 680 or 690, the "first" data point is used—using similar logic to the "on-bottom" logic. That is, when replacing faulty on bottom data, for example, a first instance of reaming up is used since it is the 'freshest' data sample available.

The profile 601 also provides an illustration of multiple instances of depth measurements for a particular 695 depth value 520, and also illustrates that only the first instance of the measurements at this particular 695 depth value 520 is an on-bottom measurement 612. Accordingly, only the first measured instance of measured variable values 520 at the particular 695 depth value 520 are initially included in the on-bottom depth-indexed data file 320 (FIG. 5B).

Figure 7A:
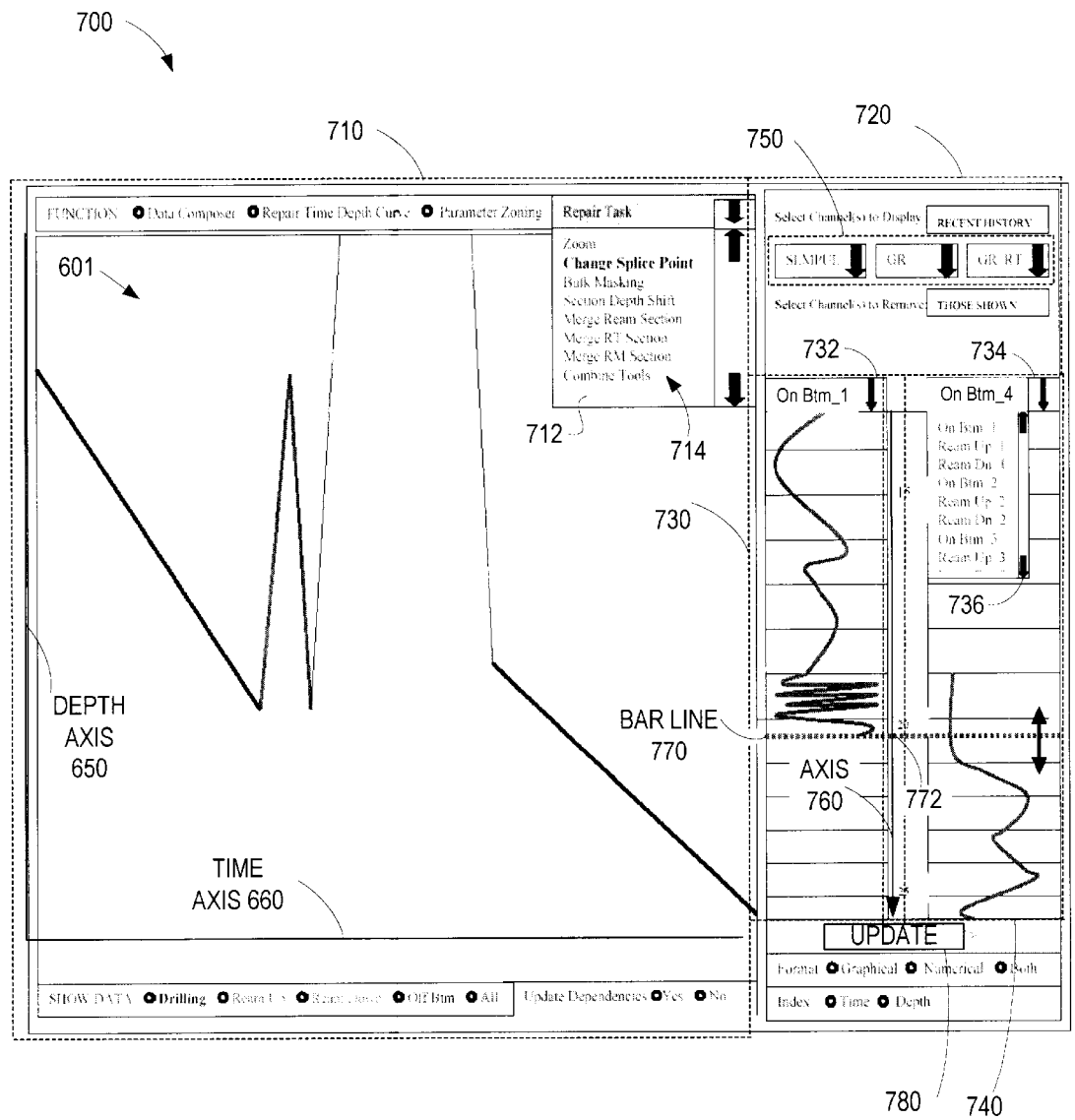
FIGS. 7A and 7B illustrate graphical user interfaces for a logging program to assist in editing data records, according to an embodiment.

Referring to FIG. 7A, a graphical user interface (GUI) 700 for the process 470 (FIG. 4) is illustrated, according to one embodiment of the invention. The GUI 700 assists in editing data records 515 (FIGS. 5A and 5B) of the composite data file 460 to create a new data file 460A, as described in connection with FIG. 4. The GUI 700 includes a first window 710 for graphically displaying a time/depth profile 601 plotted against depth axis 650 and time axis 660. In one embodiment, a user selects, from a pull down menu 712, one of a number of predefined data record editing functions 714, such as 'change splice point' function, to edit or modify the data records 515. The selected one of the functions 714 is highlighted to indicate its selection.

A second window 720 includes a number of pull down menus 750 for selecting respective logging variable identities 510 (FIG. 5) of composite file 460. The logging variable identities 510 may be from any one of the channels 517 included in the composite file 460. For example, the three menus 750 may be used to select file 460 channels 517 for neutron porosity (NPHI), natural gamma ray, and temperature measurements respectively. The logging variables, which may be selected by menus 750, may also include computed variables such as density (RHOB) that are not measured by the tool 30, but which are derived from the measured variables included in file 460. (Although a logging variables may be derived from directly measured variables, it may nevertheless be referred to herein as a "measured variable.")

A third window 730 includes a pull down menu 732 for selecting an instance from a set or sets of instances of the selected measured variable identity or identities 510 for display. When the pull down menu 732 is not pulled down, as shown in FIG. 7A, the selected set(s) of instances is visible at the top of the menu 732. That is, the selectable instances are associated with respective depth intervals, and the pulldown menu 732 lists the depth intervals according to names that indicate the context, such as "on-bottom", "reaming-up first instance" (or, more simply, "reaming_up_1 ", "reaming_up_2", "reaming_down_1", etc). Examples of these contexts were illustrated in FIG. 6, such as on-bottom 612, reaming up 620 and reaming down 630. The measurements corresponding to the selected instance are displayed on a depth or time axis 760 in the window 730.

A fourth window 740 includes a second pull down menu 734 for selecting one instance from a set of instances 736 of the selected measured variable identity or identities 510 to display in the fourth window 740 on the same axis 760. It must be reiterated that there may be numerous instances, and thus numerous values 520, of the logging variable at the same depth not only due to re-traversing the same depth with reaming passes, but also due to the logging variable being measured by more than one measurement means, including real time measurement and recorded mode measurement. Consequently the pulldown menus 732 and 734 associated with the third and fourth windows 730 and 740 may also include selectable entries for the respective measurement means.

The GUI 700 also includes a number of controls for user interaction. For example, the GUI 700 includes at least one bar line 770 traversing the measurements corresponding to the first and second set of instances selected. The bar line 770 is moveable or scrollable perpendicular to the axis 760 for selecting at least one particular measurement 772 on the axis 760.

The GUI 700 controls include an interface button 780 that is operable to instruct the process 470 of the logging program to update/edit the data records 515, such as to create a new file 460A, as described in connection with FIG. 4. The edited or updated data records include measurements corresponding to the first and second set of instances being spliced in accordance with a predefined function. In one embodiment, the predefined function corresponds to the selected data record editing function 714, such as 'change splice point'. In this embodiment, the predefined function 714 defines splicing measurements corresponding to the first set of instance up to the at least one particular measurement 772 with measurements corresponding to the second set of instance after the at least one particular measurement 772.

Figure 7B:
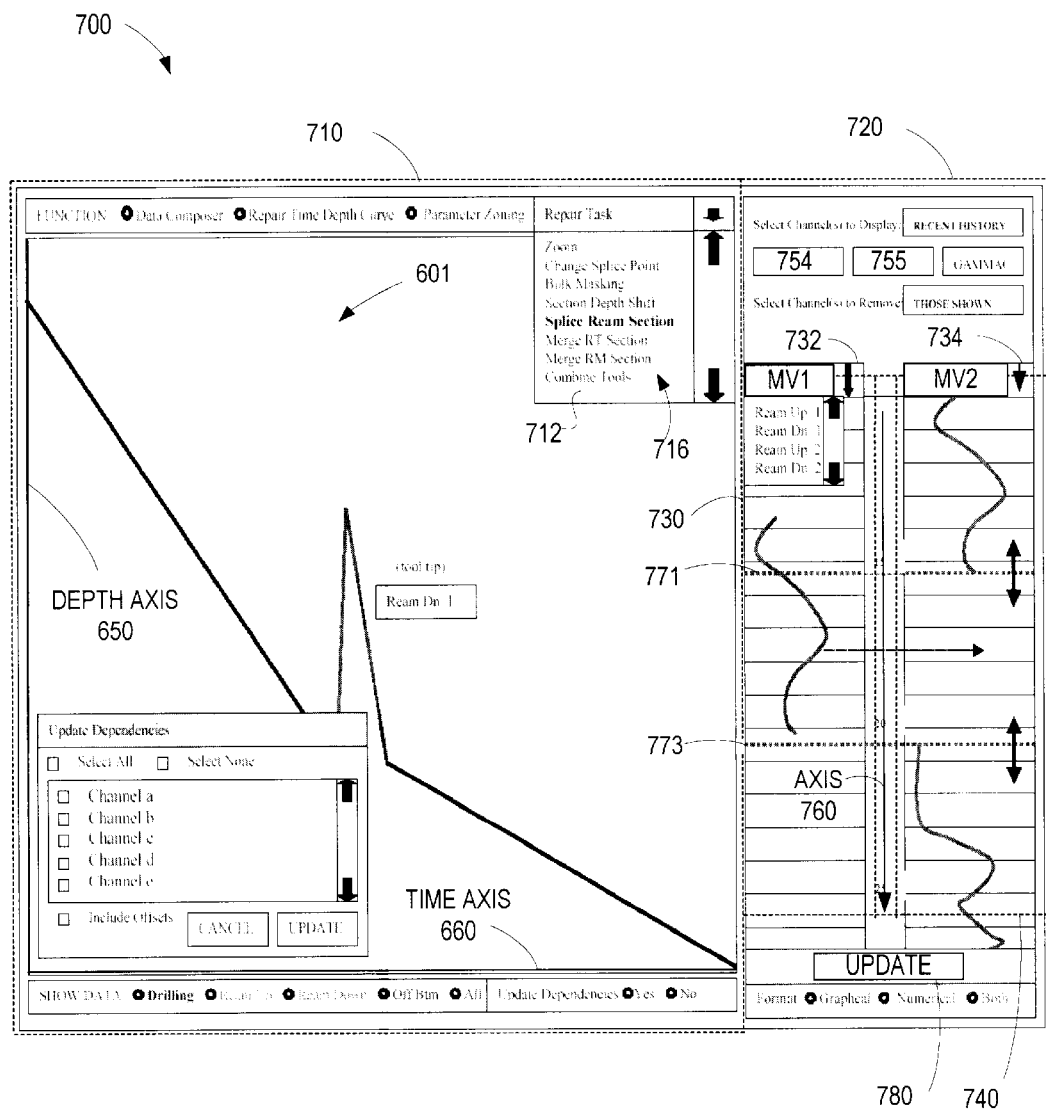

Referring to FIG. 7B, the GUI 700 for the logging program is illustrated according to an alternative embodiment. In this embodiment, a user selects another data record editing function such as 'splice ream section' 716 from the pull down menu of predefined functions 712 included in the first window 710. The selected function may be highlighted to indicate its selection. The first window 710 displays depth versus time measurements included in the well logging data. For example, the depth versus time measurements may be displayed as a time/depth profile 601.

The GUI 700 includes the second window 720, which has fields for defining two logging variables 754 and 755. The logging variables 754 and 755 may be indicative of any channel included in the logging data, such as a channel to acquire neutron porosity (NPHI), natural gamma ray, and temperature measurements from a sensor. Logging variables 754 and 755 may also include computed variables such as density (RHOB) that are not recorded by the tool 30. A pull down menu 732 associated with each of the fields may select another logging variable from a list of variables.

A third window 730 includes the first pull down menu 732 for selecting an instance from a set of instances of MV1 the selected logging variable 754 for display. That is, the selectable instances are associated with respective depth intervals, and the pulldown menu lists the depth intervals according to names that indicate the context, such as "on-bottom", "reaming-up first instance" (or, more simply, "reaming_up_1", "reaming_up_2", "reaming_down_1", etc). The measurements corresponding to the selected instance are displayed on the depth or time axis 760. In this embodiment, reaming data associated with the logging variable 754 is displayed.

A fourth window 740 includes the second pull down menu 734 for selecting an instance from a set of instances of MV2 the logging variable 755 included in the logging data for display in the fourth window 740. The measurements corresponding to the selected instance are displayed on the same axis 760. It must be reiterated that there may be numerous instances of the logging variable 755 at the same depth not only due to re-traversing the same depth, but also due to the logging variable 755 being measured by more than one measurement means, including real time measurement and data collection and recorded mode measurement and data collection. Consequently the pulldown menus associated with the third and fourth windows may also include selectable entries for the respective measurement means. In this embodiment, on-bottom data for the logging variable 755 is displayed in the fourth window 740.

In this embodiment, the GUI 700 controls include a starting bar line 771 and an ending bar line 773 traversing the measurements corresponding to the logging variables 754 and 755 selected. The starting bar line 771 defines a starting point of a depth range bounded by 771 and 773. Similarly, the ending bar line 773 defines the end point of the depth range. The bar lines 771 and 773 are moveable or scrollable perpendicular to the axis 760 for varying the depth range on the axis 760. In an alternative embodiment, the starting and ending points for the depth range may be entered numerically in a range definition field of the second window 720.

In this embodiment, the GUI 700 controls include the interface button 780 that is operable to instruct the program to update/edit the data records 515. The edited or updated data records include measurements corresponding to the logging variables 754 and 755 being spliced in accordance with a predefined function. In one embodiment, the predefined function corresponds to the selected data record editing function, such as 'splice ream section' 716. In this embodiment, the predefined function defines splicing measurements corresponding to the logging variable 754 included between the depth range bounded by the starting bar line 771 and the ending bar line 773 with measurements corresponding to the logging variable 775 that lie outside the depth range.

Various other embodiments having various modifications to the GUI 700 may be suited to a particular use contemplated, but may be within the scope of the present invention. For example, those of ordinary skill in the art will appreciate that the particular use or placement of buttons and/or pull down menus may vary depending on the implementation. Also, while the present invention has been described in the software process generating data files, those of ordinary skill in the art will appreciate that data files are just one example of a data structure the software process may generate to make the well logging data more accessible.

In alternative embodiments, the GUI 700 may be modified in accordance with the data record editing function selected by pull down menu 712 included in the first window 710. Various data record editing functions such as zoom, change splice point 714, bulk masking, section depth shift, merge ream section, merge real-time section, merge recorded mode section, combine tools, splice ream section 716 are provided. Each function selected may result in modifications to the GUI 700, and may correspond to another predefined function. Some of these editing functions are briefly described in Table T-701.

TABLE T-701

| Editing Function | Description |
| --- | --- |
| Change Auto Splice Point | The user has data from two consecutive bit runs which are attained using different tools for a number of reasons, including a tool failure from the first bit run, and adding a different tool to the second bit run. The default setting of the program is to use the data records from the first bit run to the deepest depth, as this is the most valuable. The user needs to edit this default and be able to use the data records from the second bit run where data from the first bit run is not required. |
| Select start/stop depth of single or multiple channels | During the drilling process multiple passes are created from reaming or drilling. Within each of these passes are multiple channels. Each channel has a start and stop depth. The data from each of these channels is used in the creation of the CWLDS. All data is passed to the CWLDS dependent upon its start and stop depth and whether it overlaps other drilling passes. These start and stop depths can be altered to allow or deny data being used within the CWLDS. This data may be incorrect for several reasons including gathered while inside cased hole, while off-bottom, during sliding, sensor failure or tool failure. |
| Splice RT and RM data | The user has RT and RM data that is taken from the same bit run. User needs to add a section of RT data into the RM log if the RM data is suffering from errors such as corrupted data. |
| Differentiate between drilling and ream passes | Throughout the job multiple bit runs and ream passes are created. The user needs to be able to easily differentiate between the types of data passes and to be able to select them accordingly. The data is displayed with an appearance relative to the time or depth at which it is gathered. |
| Repair a time depth curve | The user detects errors to the recording of the depth data. These errors are to be repaired and these repairs are reflected in all channels stored from RT and RM so the corrected data appears in the DOBCOWW at the correct depth. The repair is in the form of a block shift of data or an averaging of the error across a set depth to reduce the possible error. |
| Change zoned parameters | During the drilling process multiple parameters are stored which are used for the calculations of certain channels. These parameters include mud properties or the down-hole environment such as temperature. The user updates these parameters during real time and these values are stored within the system. If however if these values are found to be incorrect the user selects which parameter to change and alter the range over which it was applied. The channels affected by this parameter are re-calculated. |

TABLE T-701-continued

| Editing Function | Description |
| --- | --- |
| Splice in ream data to DOBCOWW | During certain parts of the well, once it has been drilled, it is necessary to make a ream pass across a certain section of the current well bore. This may be at the start, end or during the drilling pass of a specific bit run. The reasons for this may be the changing of the BHA between bit runs creating depth differences in sensor position, the addition of new tools that allows the gathering of data not possible during the previous bit run or the gathering of rotary measurements that were not possible during the steering sections of the well. |
| Depth shift ream pass | When on bottom data is being recorded the drill pipe carrying the measurement tools is under compression to apply pressure to the bit to aid the drilling process. This compression results in the measurements being at a different depth to those attained during a reaming pass. During reaming passes there is no compression of the drill pipe and a difference in depth against the on bottom drilling data results. Although the drill pipe undergoes stretching due to its own weight during reaming, there still often remains a difference in depth. The user is able to adjust the depth of the whole reaming pass. |
| Bulk masking | Throughout a ream or on bottom drilling pass, the down-hole tools undergo extreme shocks and forces. This environment can cause temporary loss of signal or transmission of real time data that is incorrect due to poor signal quality or an intermittent failure of a tool or sensor. For this reason the user needs the option of removing ranges of data from the DOBCOWW. This data may be in the middle of a ream or drilling pass and the start/stop repair is therefore not practical. |
| Update dependencies | All channels that are recorded by the system are received directly from the down-hole tools or the surface sensors located around the well site. These channels are then used to calculate further channels that are derived from one or more than one of the original recordings. The depth of these channels may be the same as the original channel or at a different depth. When one of these original channels is updated it is necessary to update all other channels that are derived from it. If a parameter is changed such as mud weight, then all channels that use mud weight in their calculation also require to be changed. |
| Reaming after the fact | When the down hole tool is transmitting data, the data is only written to a depth stamp on certain occasions, these include when new footage is drilled ('on bottom') or during reaming passes. When the drill string is 'off bottom' then the data is stored in the time domain, but not the depth domain. Subsequently the recorded mode data follows the same pattern and only data attained by the tool during 'on bottom' or ream passes is stored against a depth for client delivery. There may be times when it is necessary to change the status of the 'off bottom' data to be associated with a ream status and subsequent depth stamp. Reasons for this may be poor signal transmission or tool failure. |

Figure 8A:
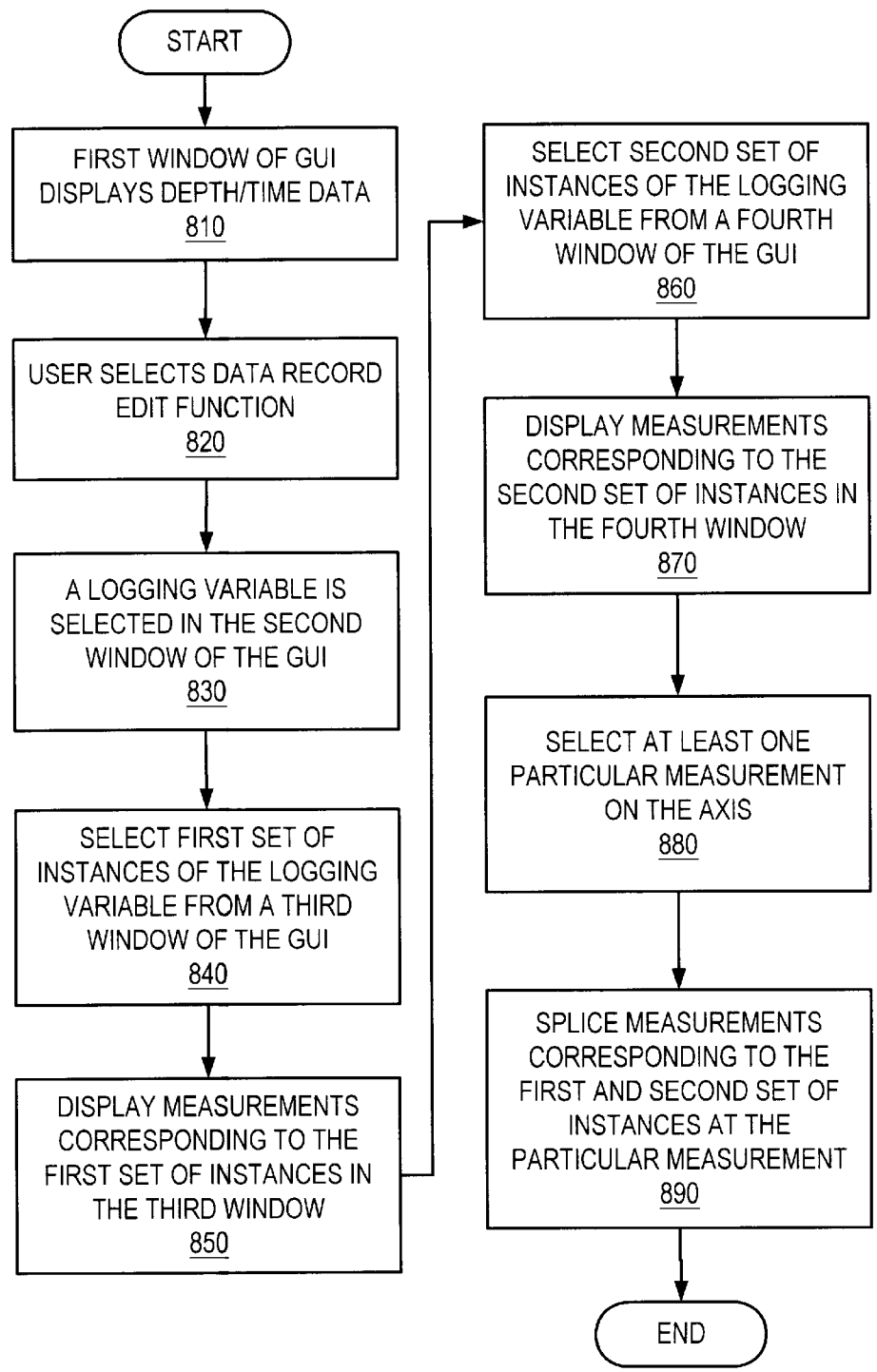
FIGS. 8A and 8B illustrate flow diagrams of a method for editing data records, according to an embodiment.

Referring to FIG. 8A, a flow diagram for a method of editing data records 515 (FIGS. 5A and 5B) included in well logging data is illustrated, according to one embodiment. Refer also to FIG. 7A in connection with the following description. The well logging data includes measurements of logging variables collected at successive depths to define the data records 515, as well as instances of the respective measurements collected at the same depth. The technique is applicable for real-time and/or recorded data records.

In step 810, the first window 710 of a logging display displays depth versus time measurements included in the well logging data. For example, the depth versus time measurements may be displayed as a depth versus time profile 601 display (FIG. 6).

In step 820, a user clicks on the edit pulldown menu 712 to select a particular edit function. For example, the user selects the change splice point function 714 from a list of available edit functions.

In step 830, a first field in the second window 720 of the display is used to enter a selection for identifying or defining at least one logging variable 750. In one embodiment, most recent history of selected logging variables may be automatically displayed in the second window 720. In one embodiment, the logging variables may be automatically selected and displayed in response to the user selection of the data record edit function in step 820.

In step 840, a first set of instances of the at least one logging variable 750 from the first pull down menu 732 is selected in the third window 730 of the display using pulldown menu 732. In step 850, measurements corresponding to the first set of instances on the depth or time axis 760 are displayed in the third window 730 in response to the selection.

In step 860, a second set of instances of the at least one logging variable 750 is selected from a second pulldown menu 734 in the fourth window 740 of the display. In step 870, measurements corresponding to the second set of instances on the depth or time axis 760 are displayed in the fourth window 740 in response to the selection.

In step 880, at least one particular measurement 772 is selected on the axis 760 by moving the at least one bar line 770, which traverses the measurements corresponding to the first and second set of instances. The bar line 770 is moveable perpendicular to the axis (760) to select the particular depth measurement 772.

In step 890, the data records 515 are editing by splicing measurements corresponding to the first and second set of instances of the logging variable 750 in accordance with a predefined function.

Figure 8B:
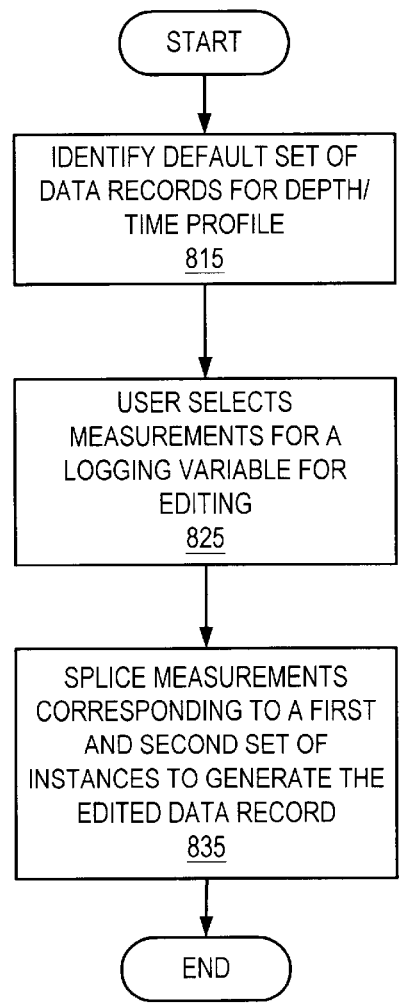

Referring to FIG. 8B, a flow diagram for a method of editing data records 515 included in well logging data is illustrated according to one embodiment. The well logging data includes measurements of logging variables collected at successive depths to define the data records 515, as well as instances of the respective measurements collected at the same depth. The technique is applicable for real-time and/or recorded data records.

In step 815, a default set of data records that correspond to depth versus time measurements included in the well logging data are identified. For example, a set of data records (referred to as the default set) included in depth-indexed data file 460 in FIG. 4 may be used to generate depth versus time profile display 601 in FIG. 6.

In step 825, measurements corresponding to a first set of instances of the at least one logging variable 750 included in the default set are selected for editing.

In step 835, at least one measurement from the measurements corresponding to the first instance are spliced with another at least one measurement from measurements corresponding to a second set of instances of the at least one logging variable to generate the edited data records.

Various steps of FIGS. 8A and 8B may be added, omitted, combined, altered, or performed in different orders. For example, in one embodiment, step 820 in FIG. 8A may be omitted. That is, an often selected data record editing function such as change splice point 714 or the previously selected edit function may be set as a default option.

Figure 9:
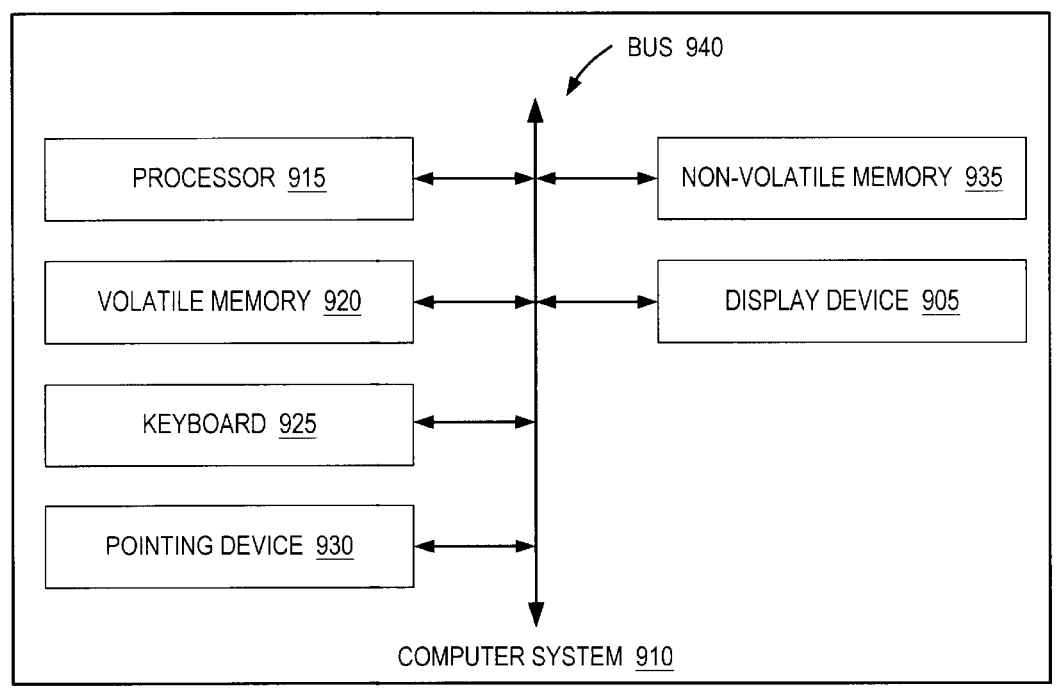
FIG. 9 is a computer system appropriate for implementing one or more embodiments of the present invention.

Referring now to FIG. 9, a computer system 910 is shown that is generally applicable for the various embodiments described. The system 910 includes a processor 915, a volatile memory 920, e.g., RAM, a keyboard 925, a pointing device 930, e.g., a mouse, a nonvolatile memory 935, e.g., ROM, hard disk, floppy disk, CD-ROM, and DVD, and a display device 905 having a display screen. Memory 920 and 935 are for storing program instructions, which are executable by processor 915 to implement various embodiments of a method in accordance with the present invention. The memory 920 and 935 may be used to store portions of the time-indexed data sets. Components included in system 910 are interconnected by bus 940. A communications device (not shown) may also be connected to bus 940 to enable information exchange between system 910 and other devices such as other computer systems via a network such as the Internet.

In various embodiments system 910 takes a variety of forms, including a personal computer system, client/server system, mainframe computer system, parallel processing computer system, workstation, Internet appliance, PDA, an embedded processor with memory, etc. That is, it should be understood that the term "computer system" is intended to encompass any device having a processor that executes instructions from a memory medium.

The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++, Java and Microsoft Foundation Classes (MFC).

The description of the present embodiment has been presented for purposes of illustration, but is not intended to be exhaustive or to limit the invention to the form disclosed. Many modifications and variations will be apparent to those of ordinary skill in the art. To reiterate, the embodiments were chosen and described in order to best explain the principles of the invention, the practical application, and to enable others of ordinary skill in the art to understand the invention.

Various other embodiments having various modifications may be suited to a particular use contemplated, but may be within the scope of the present invention. For example, those of ordinary skill in the art will appreciate that the hardware and methods illustrated herein may vary depending on the implementation. Also, while the present invention has been described in the software process generating data files, those of ordinary skill in the art will appreciate that data files are just one example of a data structure the software process may generate to make the well logging data more accessible. Other data structures may alternatively be generated, such as a random access database. Additionally, it is important to note that while the present invention has been described in the context of a computer system having a processor and memory, those of ordinary skill in the art will appreciate that the processes of the present invention are capable of being distributed as computer readable medium of instructions in a variety of forms and that the present invention applies equally regardless of the particular type of signal bearing media actually used to carry out the distribution. Examples of computer readable media include recordable-type media such as a floppy disc, a hard disk drive, a RAM, CD-ROM, CD-RW, DVD and transmission-type media such as digital and analog communications links.

To reiterate, many additional aspects, modifications and variations are also contemplated and are intended to be encompassed within the scope of the following claims. Moreover, it should be understood that in the following claims, actions are not necessarily performed in the particular sequence in which they are set out.

What is claimed is:

1. A graphical user interface (GUI) (700) of a well logging display program for editing data records (515) included in well logging data, the well logging data including measurements of logging variables collected at successive depths to define the data records (515), the well logging data also including instances of the respective measurements collected at the same depth, the GUI (700) comprising:

a first window (710) for displaying depth versus time measurements included in the well logging data;

a second window (720) including a first field for defining at least one logging variable (750);

a third window (730) including a first pull down menu (732) for a) selecting a first set of instances of the at least one logging variable (750), and b) displaying measurements corresponding to the first set of instances on a depth or time axis (760);

a fourth window (740) including a second pull down menu (734) for c) selecting a second set of instances of the at least one logging variable (750), and d) displaying measurements corresponding to the second set of instances on the axis (760);

at least one bar line (770) traversing the measurements corresponding to the first and second set of instances, the bar line (770) being moveable perpendicular to the axis (760) for selecting at least one particular measurement (772) on the axis (760); and an interface button (780) for instructing the program to edit the data records (515), wherein the edited data records include measurements corresponding to the first and second set of instances being spliced in accordance with a predefined function.

2. The GUI (700) of claim 1, wherein the predefined function defines splicing measurements corresponding to the first set of instance up to the at least one particular measurement (772) with measurements corresponding to the second set of instance after the at least one particular measurement (772).

3. The GUT (700) of claim 1, wherein the function includes verifying measurements corresponding to the first set of instance up to the at least one particular measurement (772) are compatible with measurements corresponding to the second set of instance after the at least one particular measurement (772).

4. The GUI (700) of claim 1, wherein the measurements corresponding to the first and second set of instances are adjacently displayed.

5. The GUI (700) of claim 1, wherein the second window (720) includes respective fields for defining third (754) and fourth (755) logging variables, the third window (730) includes the pull down menu (732) for a) selecting a third set of instances of the third logging variable (754), and b) displaying measurements corresponding to the third set of instances on the axis (760), and the fourth window (740) includes the pull down menu (734) for c) selecting a fourth set of instances of the fourth logging variable (755), and d) displaying measurements corresponding to the fourth set of instances on the axis (760); and wherein the at least one bar line (770) comprises a start (771) and a stop (773) bar line, wherein each such bar line traverses the measurements corresponding to the third and fourth set of instances, the bar lines (771, 773) being moveable perpendicular to the axis (760) for selecting a starting and ending measurement on the axis (760), wherein the interface button (780) is operable to execute the program to edit the data records (515), wherein the edited data records includes measurements corresponding to the third and fourth set of instances being spliced in accordance with a different predefined function.

6. The GUI (700) of claim 5, wherein the different predefined function defines replacing measurements corresponding to the third set of instances between the starting and ending measurements with measurements corresponding to the fourth set of instances between the starting and ending measurements.

7. The GUI (700) of claim 1, wherein the data records (515) are edited after the well logging data has been acquired.

8. The GUI of claim 1, wherein the well logging data is acquired in a real-time mode.

9. The GUI of claim 1, wherein the well logging data is acquired in a recorded mode.

10. A method for editing data records (515) included in well logging data, the well logging data including measurements of logging variables collected at successive depths to define the data records (515), the well logging data also including instances of the respective measurements collected at the same depth, the method comprising:

displaying in a first window (710) of a logging display depth versus time measurements included in the well logging data;

selecting a first field in a second window (720) of the display for defining at least one logging variable (750);

selecting a first set of instances of the at least one logging variable (750) from a first pull down menu (732) in a third window (730) of the display;

displaying measurements corresponding to the first set of instances on a depth or time axis (760);

selecting a second set of instances of the at least one logging variable (750) from a second pull down menu (734) in a fourth window (740) of the display;

displaying measurements corresponding to the second set of instances on the axis (760);

selecting at least one particular measurement (772) on the axis (760) by moving at least one bar line (770), the at least one bar line (770) traversing the measurements corresponding to the first and second set of instances, the bar line (770) being moveable perpendicular to the axis (760); and editing the data records (515) by splicing measurements corresponding to the first and second set of instances in accordance with a predefined function.

11. The method of claim 10, wherein the predefined function defines splicing measurements corresponding to the first set of instance up to the at least one particular measurement (772) with measurements corresponding to the second set of instance after the at least one particular measurement (772).

12. The method of claim 10, wherein the function includes verifying measurements corresponding to the first set of instance up to the at least one particular measurement (772) are compatible with measurements corresponding to the second set of instance after the at least one particular measurement (772).

13. The method of claim 10, wherein the measurements corresponding to the first and second set of instances are adjacently displayed.

14. The method of claim 10, wherein the second window (720) includes respective fields for defining third (754) and fourth (755) logging variables, the third window (730) includes the pull down menu (732) for
a) selecting a third set of instances of the third logging variable (754), and
b) displaying measurements corresponding to the third set of instances on the axis (760), and the fourth window (740) includes the pull down menu (734) for
c) selecting a fourth set of instances of the fourth logging variable (755), and
d) displaying measurements corresponding to the fourth set of instances on the axis (760); and wherein the at least one bar line (770) comprises a start (771) and a stop (773) bar line, wherein each such bar line traverses the measurements corresponding to the third and fourth set of instances, the bar lines (771, 773) being moveable perpendicular to the axis (760) for selecting a starting and ending measurement on the axis (760), wherein the interface button (780) is operable to execute the program to edit the data records (515), wherein the edited data records includes measurements corresponding to the third and fourth set of instances being spliced in accordance with a different predefined function.

15. The method of claim 14, wherein the different predefined function defines replacing measurements corresponding to the third set of instances between the starting and ending measurements with measurements corresponding to the fourth set of instances between the starting and ending measurements.

16. A method for editing data records (515) included in well logging data, the well logging data including measurements of logging variables collected at successive depths to define the data records (515), the well logging data also including instances of the respective measurements collected at the same depth, the method comprising:

identifying a default set of data records that correspond to depth versus time measurements included in the well logging data;

selecting measurements corresponding to a first set of instances of at least one logging variable (750) included in the default set;

splicing at least one measurement from the measurements corresponding to the first set of instances by another at least one measurement from measurements corresponding to a second set of instances of the at least one logging variable (750) to generate the edited data records.

17. A data acquisition and logging system operable to edit data records (515) included in well logging data, the well logging data including measurements of logging variables collected at successive depths to define the data records (515), the well logging data also including instances of the respective measurements collected at the same depth, the system comprising:

a processor (915);

a display device (905) coupled to the processor (915); and a memory (920, 935) storing instructions operable with the processor (915), the instructions being executed for:

the display device (905) displaying in a first window (710) of a logging display depth versus time measurements included in the well logging data;

selecting a first field in a second window (720) of the display for defining at least one logging variable (750);

selecting a first set of instances of the at least one logging variable (750) from a first pull down menu (732) in a third window (730) of the display;

the display device (905) displaying measurements corresponding to the first set of instances on a depth or time axis (760);

selecting a second set of instances of the at least one logging variable (750) from a second pull down menu (734) in a fourth window (740) of the display;

the display device (905) displaying measurements corresponding to the second set of instances on the axis (760);

selecting at least one particular measurement (772) on the axis (760) by moving at least one bar line (770), the at least one bar line (770) traversing the measurements corresponding to the first and second set of instances, the bar line (770) being moveable perpendicular to the axis (760); and editing the data records (515) by splicing measurements corresponding to the first and second set of instances in accordance with a predefined function.

18. The system of claim 17, wherein the predefined function defines splicing measurements corresponding to the first set of instance up to the at least one particular measurement (772) with measurements corresponding to the second set of instance after the at least one particular measurement (772).

19. The system of claim 17, wherein the function includes verifying measurements corresponding to the first set of instance up to the at least one particular measurement (772) are compatible with measurements corresponding to the second set of instance after the at least one particular measurement (772).

20. The system of claim 17, wherein the measurements corresponding to the first and second set of instances are adjacently displayed.

21. The system of claim 17, wherein the second window (720) includes respective fields for defining third (754) and fourth (755) logging variables, the third window (730) includes the pull down menu (732) for
a) selecting a third set of instances of the third logging variable (754), and
b) the display device (905) displaying measurements corresponding to the third set of instances on the axis (760), and the fourth window (740) includes the pull down menu (734) for
c) selecting a fourth set of instances of the fourth logging variable (755), and d) the display device (905) displaying measurements corresponding to the fourth set of instances on the axis (760); and wherein the at least one bar line (770) comprises a start (771) and a stop (773) bar line, wherein each such bar line traverses the measurements corresponding to the third and fourth set of instances, the bar lines (771, 773) being moveable perpendicular to the axis (760) for selecting a starting and ending measurement on the axis (760), wherein the interface button (780) is operable to execute the program to edit the data records (515), wherein the edited data records includes measurements corresponding to the third and fourth set of instances being spliced in accordance with a different predefined function.

22. The system of claim 21, wherein the different predefined function defines replacing measurements corresponding to the third set of instances between the starting and ending measurements with measurements corresponding to the fourth set of instances between the starting and ending measurements.

23. A computer program product for a data acquisition and logging system operable to edit data records (515) included in well logging data, the well logging data including measurements of logging variables collected at successive depths to define the data records (515), the well logging data also including instances of the respective measurements collected at the same depth, the computer program product comprising:

instructions for displaying in a first window (710) of a logging display depth versus time measurements included in the well logging data;

instructions for selecting a first field in a second window (720) of the display for defining at least one logging variable (750);

instructions for selecting a first set of instances of the at least one logging variable (750) from a first pull down menu (732) in a third window (730) of the display;

instructions for displaying measurements corresponding to the first set of instances on a depth or time axis (760);

instructions for selecting a second set of instances of the at least one logging variable (750) from a second pull down menu (734) in a fourth window (740) of the display;

instructions for displaying measurements corresponding to the second set of instances on the axis (760);

instructions for selecting at least one particular measurement (772) on the axis (760) by moving at least one bar line (770), the at least one bar line (770) traversing the measurements corresponding to the first and second set of instances, the bar line (770) being moveable perpendicular to the axis (760); and instructions for editing the data records (515) by splicing measurements corresponding to the first and second set of instances in accordance with a predefined function.

* * * * *